United States Patent
Gillies et al.

(10) Patent No.: US 8,059,581 B2
(45) Date of Patent: Nov. 15, 2011

(54) METHOD AND APPARATUS FOR SEAMLESS AND EFFICIENT WIRELESS HANDOFFS

(75) Inventors: Donald William Gillies, San Diego, CA (US); Gavin Bernard Horn, La Jolla, CA (US); Nikhil Jain, Mendham, NJ (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 975 days.

(21) Appl. No.: 11/326,867

(22) Filed: Jan. 5, 2006

(65) Prior Publication Data

US 2007/0153722 A1    Jul. 5, 2007

(51) Int. Cl.
*H04W 4/00* (2009.01)
(52) U.S. Cl. ............ 370/328; 370/310.2; 370/331; 370/392; 370/394; 455/436
(58) Field of Classification Search ........... 370/328, 370/310.2, 331, 392, 394; 455/436
See application file for complete search history.

(56) References Cited

U.S. PATENT DOCUMENTS

| | | | |
|---|---|---|---|
| 6,999,434 B1 * | 2/2006 | Agrawal et al. | 370/331 |
| 2002/0085514 A1 | 7/2002 | Illidge et al. | |
| 2003/0224786 A1 * | 12/2003 | Lee et al. | 455/432.1 |
| 2003/0225892 A1 | 12/2003 | Takusagawa et al. | |
| 2004/0005893 A1 * | 1/2004 | Isobe et al. | 455/436 |
| 2006/0198341 A1 * | 9/2006 | Singh et al. | 370/331 |
| 2007/0047581 A1 * | 3/2007 | Fong et al. | 370/469 |
| 2007/0155385 A1 * | 7/2007 | Balasubramanian et al. | 455/436 |

FOREIGN PATENT DOCUMENTS

| | | |
|---|---|---|
| WO | 03034683 | 4/2003 |
| WO | 2004039007 | 5/2004 |

OTHER PUBLICATIONS

International Search Report—PCT/US07/060183, International Search Authority—European Patent Office—Jan. 3, 2008.
Taiwanese Search report—096100507—TIPO—Sep. 13, 2010.
Written Opinion—PCT/US07/060183, International Searching Authority—European Patent Office, Jan. 3, 2008.

* cited by examiner

*Primary Examiner* — Barry Taylor
(74) *Attorney, Agent, or Firm* — Albert Harnois

(57) ABSTRACT

The disclosure is directed to methods and apparatuses for seamless and efficient wireless handoffs of an access terminal between access points in a communication network. The access points include memory configured to buffer packets received from a network for the access terminal, a processor configured to queue one of the packets for over the air transmission to the access terminal and fragment the data in the queued packet into multiple frames, and a transmitter configured to transmit the framed data over the air to the access terminal. The processor is further configured to maintain an indicator relating to the portion of the data in the queued packet that remains to be transmitted.

32 Claims, 6 Drawing Sheets

METHOD AND APPARATUS FOR SEAMLESS AND EFFICIENT WIRELESS HANDOFFS

BACKGROUND

1 Field

The present disclosure relates generally to telecommunications, and more particularly, to methods and apparatuses for seamless and efficient wireless handoffs.

2 Background

In conventional wireless communications, an access network is generally employed to connect any number of wireless communications devices or access terminals to wide area networks, such as the Internet or a Public Switched Telephone Network (PSTN). The access network is typically implemented with multiple fixed-site Base Transceiver Stations (BTS) dispersed throughout a geographic region. The geographic region is generally subdivided into smaller regions known as cells. Each BTS may be configured to provide a point of access to various wide area networks for all terminals in its respective cell. As such, the BTS is often referred to as an "access point". A Base Station Controller (BSC) within the access network is often used to interface each access point to the various gateways to the wide area networks. By way of example, the BSC may provide access to the Internet, or other packet-based networks, through a Packet Data Serving Node (PDSN). The BSC may also provide access to a PSTN, or other circuit-switched networks, through a Mobile Switching Center (MSC). Because the BSC is conceptually positioned at the edge of the access network, it is often referred to as an "edge function".

Each access point includes a physical layer to support an air interface with the access terminals in its cellular region. A Radio Link Protocol (RLP) above the physical layer in the access point may be used to provide for greater reliability for data transmission. In particular, the RLP interface between the access point and an access terminal provides for the retransmission of data to achieve a lower higher layer packet error rate than the physical layer could achieve alone. In the access point, the RLP may also fragment higher layer packets from the edge function into physical layer frames for over the air transmission on the forward link. The "forward link" refers to transmissions from the access point to the access terminal, and the "reverse link" refers to transmissions from the access terminal to the access point. In the reverse direction, the RLP reassembles physical layer frames it receives from the access terminal into higher level packets for transmission to the edge function.

As the access terminal roams through the access network, it may need to be handed off from a serving access point to a target access point. During handoff, the access terminal terminates the RLP interface with the serving access point and establishes a new RLP interface with the target access point. The process of tearing down and reestablishing a RLP interface may reduce efficiency and causes undesirable latencies during handoff.

SUMMARY

An aspect of an access point is disclosed. The access point includes a memory configured to buffer packets received from a network for an access terminal, a processor configured to queue one of the packets for over the air transmission to the access terminal and fragment the data in the queued packet into multiple frames, and a transmitter configured to transmit the framed data over the air to the access terminal. The processor is further configured to maintain an indicator relating to the portion of the data in the queued packet that remains to be transmitted.

An aspect of computer readable media embodying a program of instructions executable by a computer is disclosed. The program of instructions, when executed, performs a method of processing packets received from a network for an access terminal. The method includes queuing each of the packets for over the air transmission to the access terminal, fragmenting the data in the queued packet into frames, and maintaining an indicator relating to the portion of the data in the queued packet that remains to be transmitted.

An aspect of a method of processing packets received from a network at an access point is disclosed. The method includes queuing each of the packets for over the air transmission to an access terminal, fragmenting the data in the queued packet into frames, transmitting the framed data over the air to the access terminal, and maintaining an indicator relating to the portion of the data in the queued packet that remains to be transmitted.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

The various techniques described in this disclosure relate to a Virtual Radio Link Protocol (VRLP). The VLRP concept enables the RLP to operate independently at each access point. The VRLP may be used with a physical layer that supports various air interfaces including Code Division Multiple Access (CDMA), Wideband Code Division Multiple Access (WCDMA), Orthogonal Frequency Division Multiple Access (OFDMA), Time Division Multiple Access (TDMA), Frequency Division Multiple Access (FDMA), 802.11, Bluetooth, Home RF, Ultra-Wideband (UWB), or any other type of suitable air interface.

Figure 1:
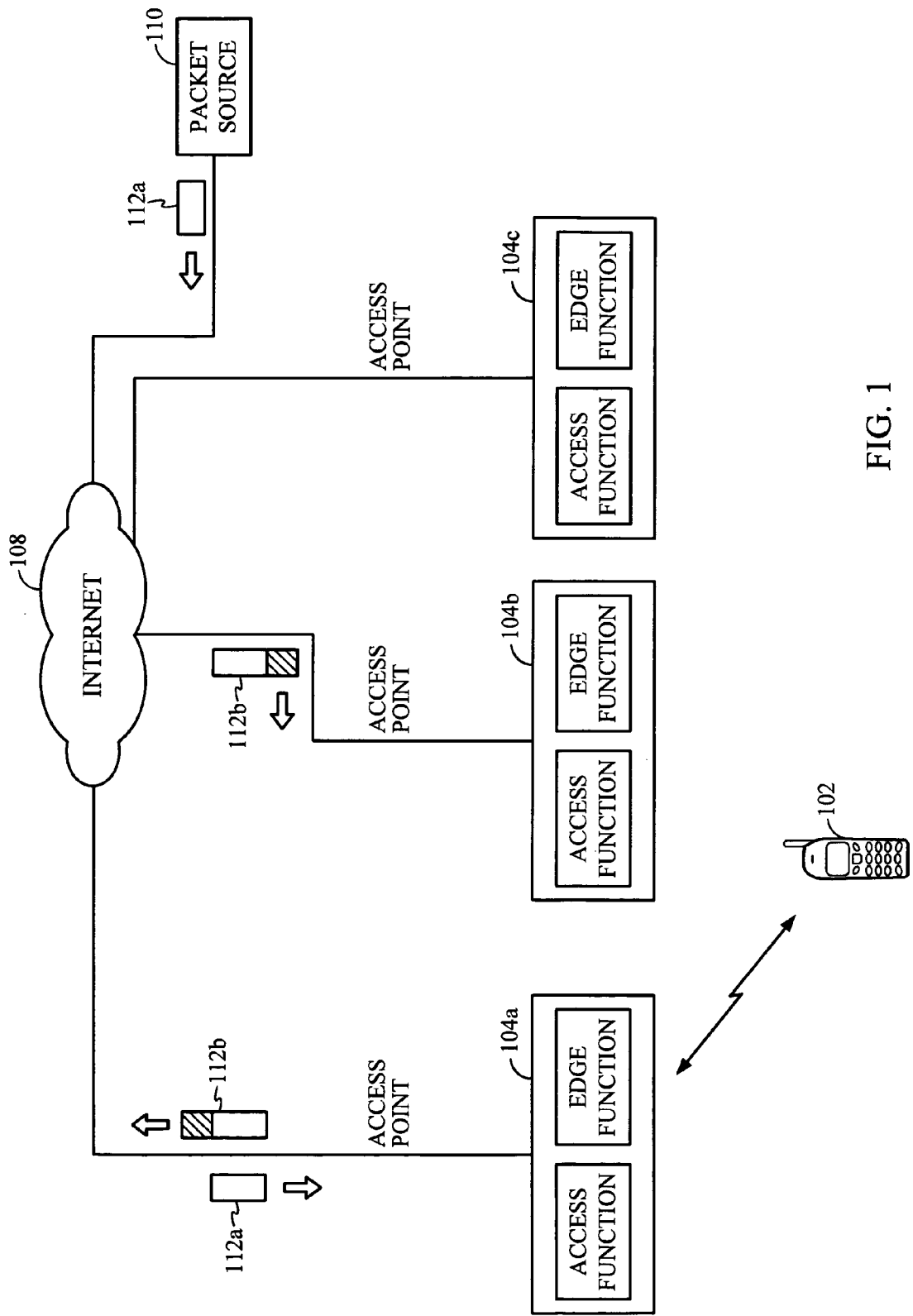
FIG. 1 is a conceptual block diagram of an embodiment of a communications network.

FIG. 1 is a conceptual block diagram of an embodiment of a communications network. An access terminal 102 is shown accessing a network. The access terminal 102 may be a wireless telephone, a laptop computer, a personal digital assistant (PDA), a data transceiver, a pager, a camera, a game console, a modem, or any other suitable access terminal. The access terminal 102 may be referred to by those skilled in the art as a handset, a wireless communications device, user terminal, user equipment, mobile station, mobile unit, subscriber station, subscriber unit, mobile radio, radio telephone, wireless station, wireless device, or some other terminology. The various concepts described throughout this disclosure are intended to apply all wireless communication devices regardless of their specific nomenclature.

A number of access points may be distributed throughout the network. For purposes of illustration, three access points 104a-104c are shown, however, any number of access points may be used to cover the geographic region of the communications network. In the embodiment shown in FIG. 1, each access point 104a-104c includes an access function. The access function serves the traditional role of a BTS by providing an air interface to the wireless communication devices in its geographic region of coverage. The access function may also provide an RLP interface with the wireless communication devices. The functionality of the traditional BSC may be distributed across multiple access points 104a-104c and are represented in FIG. 1 by edge functions. Alternatively, the edge function can be a single entity connecting multiple access points to the Internet 108. In any event, the edge function and the access functions in this example cooperate to provide a VRLP interface with the access terminal 102.

The access terminal 102 is shown in communication with a first access point 104a. The first access point 104a is referred to as a "serving" access point because it serves as a connection point to the Internet 108 for the access terminal. As the access terminal 102 roams through the network towards a second access point 104b, it begins to detect an increase in signal strength from the access point 104b. At the same time, the access terminal 102 begins to detect a decrease in the signal strength from the serving access point 104a. At some point, the access terminal 102 determines that it is going to handoff the air interface to the second access point 104b. The second access point 104b becomes the "target" access point because it is the target of the handoff. Once the handoff is complete, the target access point 104b becomes the serving access point for access terminal 102.

Various techniques may be employed to coordinate the RLP interface among multiple independent access points communicating with a single access terminal. By way of example, the access terminal's RLP interface with the serving access point 104a can be terminated and a new one established with the target access point 104b. This approach is straightforward, but has a number of drawbacks. For instance, it may prevent a user on an access terminal from roaming seamlessly through the network. In addition, undesirable latencies may occur as the access terminal is handed off from one access point to another. Alternatively, a "virtual RLP" (VRLP) may be implemented to foster a seamless transition between the access points. In the network shown in FIG. 1, the VRLP is implemented with a number of access functions distributed across three access points 104a-104c. The VLRP enables the RLP layer to operate independently at each access point. As will be explained in greater detail later, the VRLP also allows multiple physical layer frames from the same higher layer packet to be delivered to the access terminal from different access points as the access terminal roams through the network.

In the embodiment of the network shown in FIG. 1, the first access point 104a serves as the "anchor" access point. The anchor access point 104a receives all higher layer packets 112a addressed to the access terminal 102. The higher layer packets 112a are stamped by the edge function in the anchor access point 104a based on the order they are received from the Internet 108. The stamped packets 112b are then provided to the access function in the serving access point. Thus, when the anchor access point 104a is also the serving access point, the stamped packets 112b are sent between the edge function and the access function in the anchor access point 104a. When the access terminal 102 is handed off to the second access point 104b, which becomes the serving access point, the stamped packets 112b are delivered from the edge function in the anchor access point 104a to the access function in the serving access point 104b. The stamps provide a means for the access function in the serving access point 104b to detect the correct sequence of the packets.

The access function in the serving access point is used to convert the higher layer packets 112b from the packet source 110 into physical layer frames for transmission to the access terminal 102 over the air interface. As the access point pulls data from a higher layer packet and transmits it in a physical layer frame, a pointer is maintained that identifies the data that remains to be transmitted in the higher layer packet. Should the access terminal 102 be handed off between access points while the serving access point is in the middle of transmitting data from a higher layer frame to the access terminal, both the higher layer packet and the pointer may be provided to the target access point. Once the handoff is complete, the target access point, which has now become the serving access point, can use the pointer to pick up where the previous access point left off and transmit the remainder of the higher layer packet to the access terminal.

Figure 2:
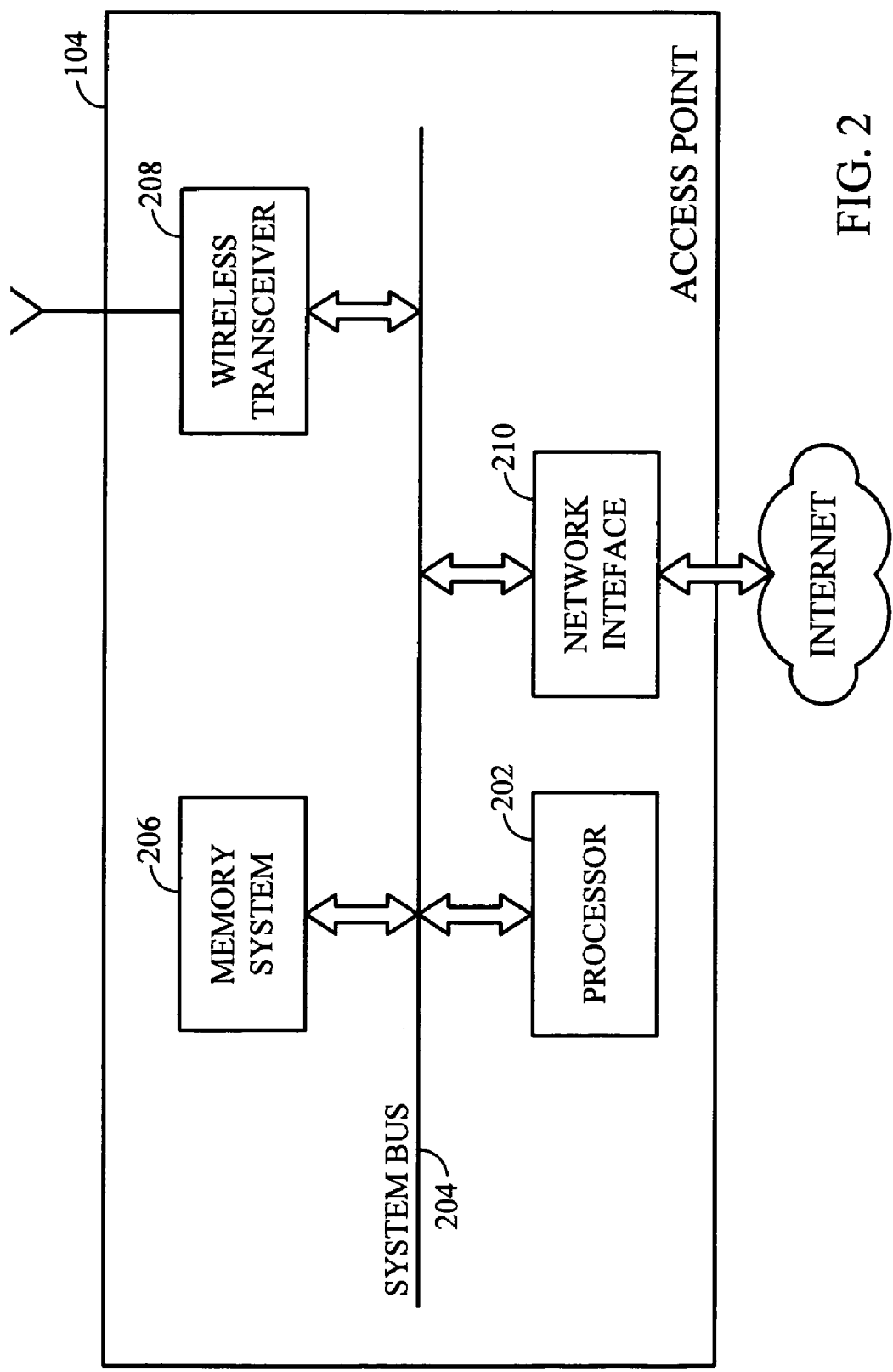
FIG. 2 is a simplified block diagram illustrating an example of an access point.

FIG. 2 is a simplified block diagram illustrating an example of an access point. The access point 104 may be implemented in a variety of fashions. In at least one embodiment, the access point 104 includes at least one processor 202 which communicates with a number of peripheral devices via a system bus 204. The processor 202 may be implemented in hardware, software, firmware, or any combination thereof. Typically, the processor 202 will be implemented with a microprocessor that supports various software applications. These software applications provide, among other things, VRLP functionality. The peripheral devices may include memory system 206. The memory system 206 may be a hard drive that provides large quantities of inexpensive permanent memory. The basic input/output system (BIOS) and the operating system are just a few examples of programs that may be stored on the hard drive. These programs may be loaded into Random Access Memory (RAM) when the access point is operational. Software applications that are launched by the access point may also be loaded into RAM from the hard drive. Caches may also be used to further increase the speed of memory access by the processor 202. The term "memory" as used herein is intended to be construed broadly to include any suitable storage medium, and is not limited to the particular memory devices, or combination of memory devices, in the described embodiment of the memory system 206.

The peripheral devices may also include various interfaces. A wireless transceiver 208 includes a transmitter and receiver to provide various filtering, amplification, and mixing functions to support an air interface with an access point. A network interface 210 provides an interface to various wide area networks, such as the Internet 108.

The manner in which the access point 104 is implemented will depend on the particular application and the design constraints imposed on the overall system. Those skilled in the art will recognize the interchangeability of hardware, firmware, and software configurations under these circumstances, and how best to implement the described functionality for each particular application.

Figure 3:
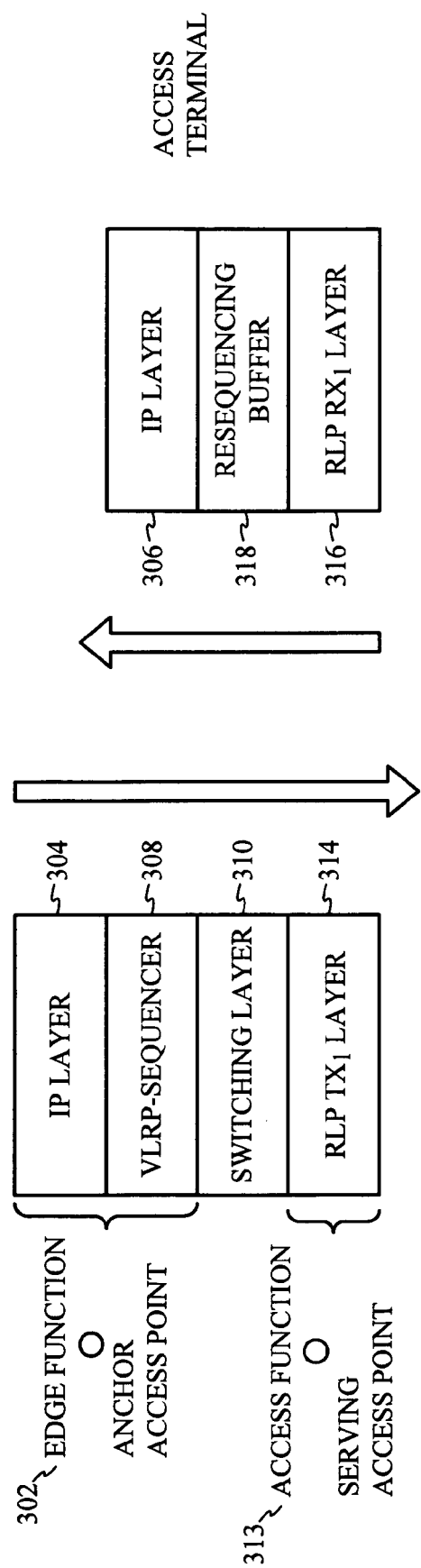
FIG. 3 is a simplified example of a protocol stack to support forward link communications.

The processor 202 may be implemented with a set of network protocol layers that work together to support communications between an access terminal and the Internet. FIG. 3 is a simplified example of a protocol stack to support forward link communications. The protocol stack includes an edge function 302 in the anchor access point and an access function 313 in the serving access point. The edge function 302 includes an IP layer 304 which maintains a virtual network connection with an IP layer 306 in the access terminal 102 as the access terminal 102 moves between access points. A VRLP sequencer layer 308 may be used to stamp each higher layer packet based on the order it was received from the Internet 108 (see FIG. 1). A switching layer 310 may be used to provide a tunnel from the edge function 302 in the anchor access point to the access function 313 in the serving access point. The access function 313 in the serving access point includes a RLP transmit layer 314. The RLP transmit layer 314 may be used to provide RLP transmit functions such as converting higher layer packets into physical layer frames to support the forward link air interface with the access terminal 102.

Figure 4:
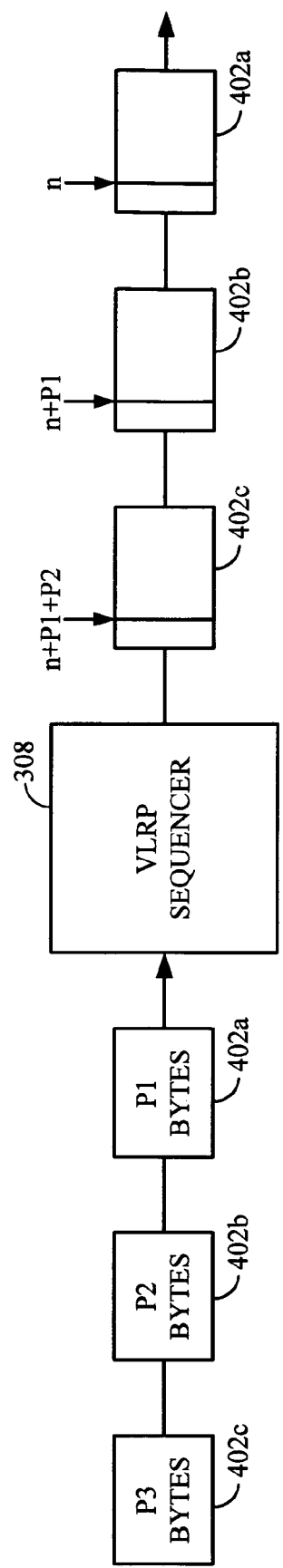
FIG. 4 is a simplified diagram illustrating the operation of a VRLP sequencer in an edge function.

The functionality of the VRLP sequencer 308 is illustrated in FIG. 4. Higher layer packets 402a-402c from the Internet 108 (see FIG. 1) are provided to the VRLP sequencer 308. The first packet 402a contains P1 bytes, the second packet 402b contains P2 bytes, and the third packet 402c contains P3 bytes. The VRLP sequencer 308 appends a stamp 404a-404c, respectively, to each packet 402a-402c. In this example, the stamp on each packet 402a-402c is set to the number of the first byte, octet, or other unit of measure, in the packet in a sequence of packets from the Internet 108 (see FIG. 1). Accordingly, the VRLP sequencer 308 stamps the first packet 402a with n, indicating that the first byte in the first packet 402a is the $n^{th}$ byte in the packet sequence. Since the first packet 402a has P1 bytes, the second packet 402b will be stamped by the VRLP sequencer 308 with (n+P1), indicating that the first byte in the second packet 402b is the (n+P1) byte in the packet sequence. Since the second packet 402b has P2 bytes, the third packet 402c will be stamped by the VRLP sequencer 308 with (n+P1+P2), indicating that the first byte in the third packet 402c is the (n+P1+P2) byte in the packet sequence.

In some embodiments, the VRLP-sequencer layer 308 may also include an edge function identifier in the stamp to foster a seamless handoff of the access terminal at the network layer. The edge function identifier may be used by the serving access point to ensure reverse link higher layer packets from the access terminal 102 are provided to the correct anchor access point.

Figure 5:
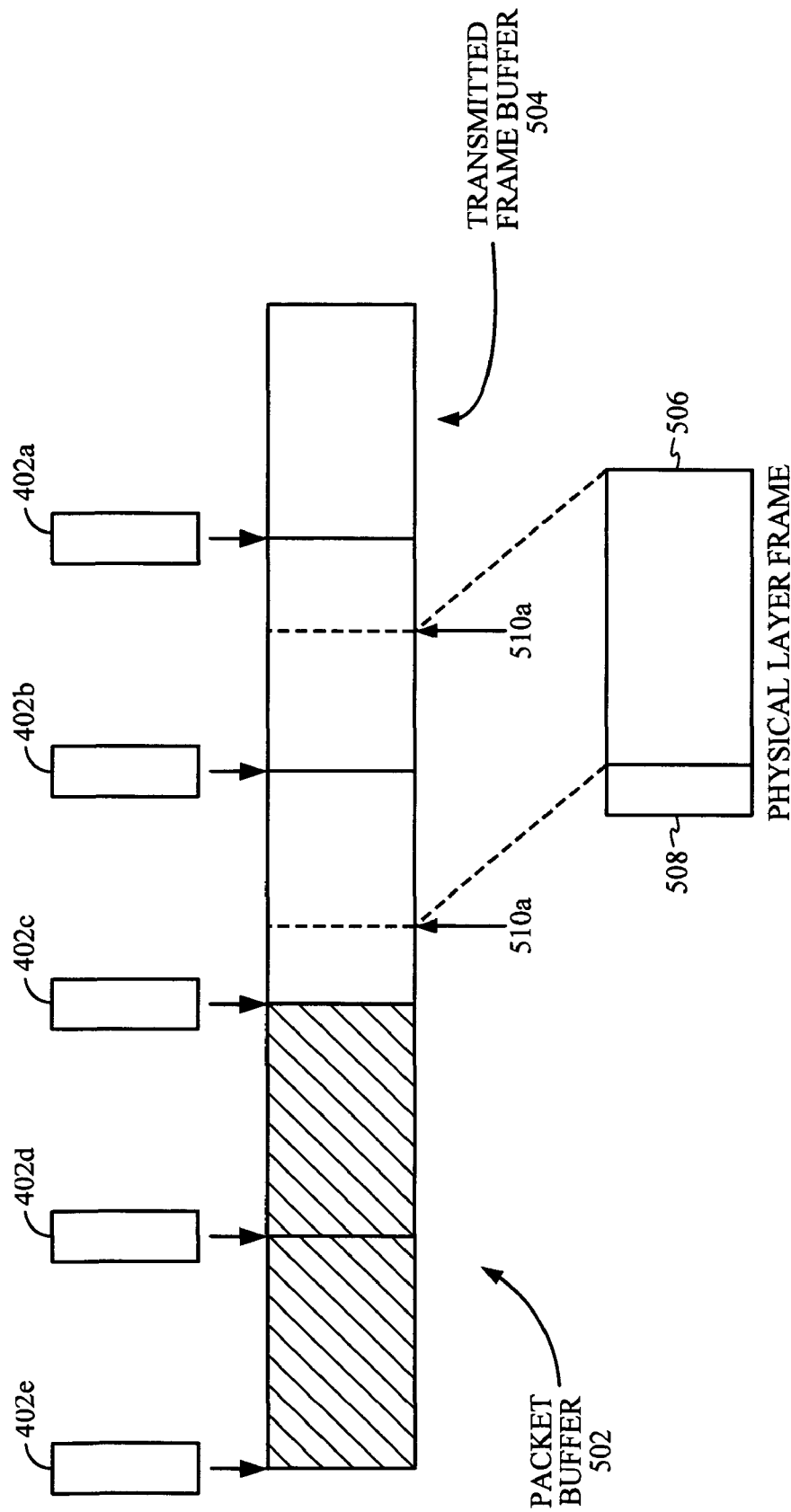
FIG. 5 is a simplified block diagram illustrating the operation of a RLP transmit layer in an access function.

The functionality of the RLP transmit layer 314 is illustrated in FIG. 5. The higher layer packets in the RLP transmit layer 314 may be stored in any number of buffers. In at least one embodiment, the RLP transmit layer 314 includes a packet buffer 502 and a transmitted frame buffer 504. The packet buffer 502 contains the higher layer packets awaiting transmission and the transmitted frame buffer 504 includes the higher layer packets sent or partially sent to the access terminal. The RLP transmit layer 314 uses the stamps 402a-402e provided by the edge function to order the higher layer packets into the correct sequence.

The RLP transmit layer 314 converts the higher layer packets in the transmitted frame buffer 504 into physical layer frames for transmission over the forward link air interface. The contents of the last physical layer frame 506 transmitted to the access terminal is shown in FIG. 5. In this example, the frame includes a RLP header 508.

The RLP transmit layer 314 also maintains a pointer for the transmitted frame buffer 504. The pointer indicates the next byte, octet, or other unit of measure, to be transmitted from the transmitted frame buffer 504. For example, before the physical layer frame 506 was transmitted, the pointer 510a was set to x, indicating that the first byte in the next physical layer frame to be transmitted to the access terminal is the $x^{th}$ byte in the packet sequence. Using the pointer, the RLP transmit layer 314 creates a physical layer frame having F1 bytes from the transmitted frame buffer 504 beginning with the $x^{th}$ byte. The pointer is then set to (x+F1), indicating the first byte of the next frame to be transmitted to the access terminal.

The packet and transmitted frame buffers 502 and 504 may reside in RAM in the memory system 206 (see FIG. 2) discussed earlier. The buffers can be located at fixed addresses in RAM with higher layer packets being written to and read out of these addresses. Alternatively, the buffers can be conceptual. That is, the addresses of the buffers in RAM change depending on where the higher layer packets received from the Internet are being stored and where the next higher layer packet to be transmitted to the access terminal is located. In alternative embodiments, the packet and transmit buffers may be dedicated buffers, such as First-In-First-Out (FIFO) registers, cache memory, or any other type of storage device. The various types of buffers may reside in the memory system 206 (see FIG. 2), the processor 202 (see FIG. 2), or anywhere else in the access point. In some embodiments, the buffers may be distributed across multiple entities in the access point. By way of example, the packet buffer could reside in RAM and the transmit buffer could be a general register file in the processor 202

The network protocol layers for the access terminal is also shown in FIG. 3. At the lowest layer of the protocol stack is the RLP receive layer 316. The RLP receive layer 316 may be used to provide RLP receive functions including error correction. The error correction may be based on a negative acknowledgement (NAK) protocol. Using this protocol, a NAK signal may be used to inform the serving access point that the physical layer frame received by the access terminal is corrupted. When a NAK is received by the serving access point, the higher layer packet from which the frame was sent can be moved from the transmitted frame buffer 504 (see FIG. 5) to a retransmission buffer (not shown). The corrupted frame may be transmitted from the retransmission buffer.

The physical layer frames are then reassembled back into higher layer packets by a resequencing buffer 318, and the higher layer packets provided to the IP layer 306 in the access terminal 102.

In the event that the access terminal is handed off between access points, the contents of the packet buffer 502 (see FIG. 5), the transmitted frame buffer 504 with the pointer (see FIG. 5), and the retransmission buffer may be provided to the target access point. At the same time, or thereabouts, the target access point sends a message to the anchor access point telling it to begin forwarding higher layer packets from the Internet to the target access point.

Following handoff, the target access point, which has now become the serving access point, provides RLP functionality. The pointer received from the original serving access point during handoff may be used to synchronize the transmitted frame buffer in the new serving access point. For example, a handoff of the access terminal following the transmission of the physical layer frame 504 in FIG. 5 would result in the contents of the transmitted frame buffer 504 in the original serving access point to be transferred to the transmitted frame buffer in the new serving access point. Signaling from the original serving access point would also cause the pointer for the transmitted frame buffer in the new serving access point to be set to (x+F1). The RLP transmit layer in the new serving access point would create a new frame having F2 bytes beginning with the (n+F1) byte in the packet sequence. The pointer would then be set to (x+F1+F2).

Figure 6:
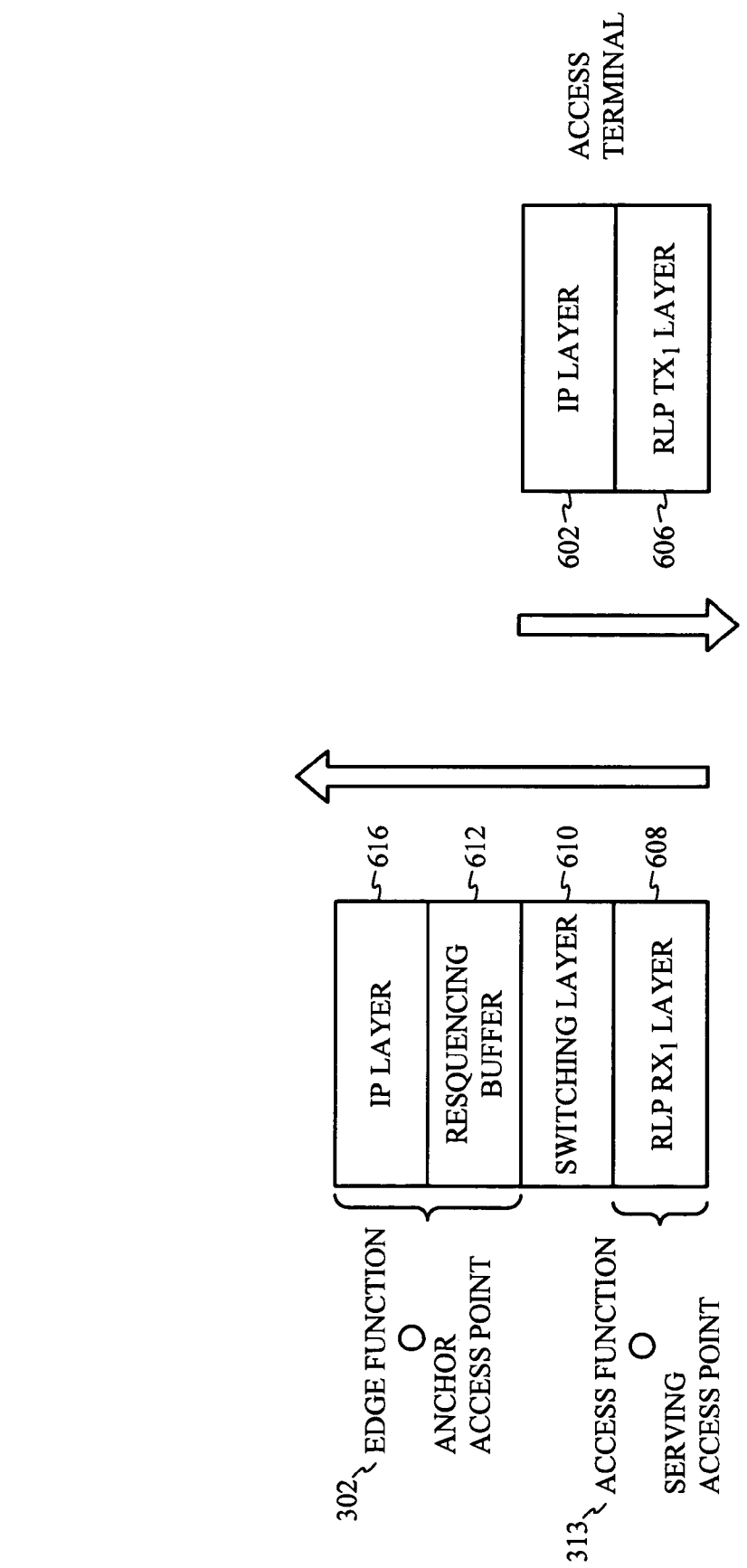
FIG. 6 is a simplified example of a protocol stack to support reverse link communications.

FIG. 6 is a simplified example of a protocol stack that may be implemented by the processor to support reverse link communications. On the reverse link, the RLP transmit layer 606 processes higher layer packets from the IP layer 602, including converting the packets into physical layer frames for transmission from the access terminal to the serving access point over the air interface.

The physical layer frames transmitted by the access terminal are received by the serving access point. The serving access point includes a RLP receive layer 608 in the access function. The RLP receive layer 608 performs RLP receive functions including reassembling the physical layer frames received over the reverse link back into higher layer packets. The switching layer 610 is then used to send the higher layer packets from the RLP receive layer 608 in the serving access point to the edge function 302 in the anchor access point. A resequencing buffer layer 412 in the anchor access point may be used to deliver ordered higher layer packets received from the serving access point to the IP layer 616.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A first access point, comprising:
an edge function configured to receive packets from a network, and append a stamp to each of the packets to indicate the order in which they are received from the network, the edge function being configured to provide the stamped packets to a second access function in a second access point when the second access point functions as a serving access point for the access terminal; and
a first access function configured to receive the stamped packets from the edge function and to convert the stamped packets into physical layer frames for transmission to the access terminal over an air interface, the first access function being further configured to transmit the physical layer frames to the access terminal and to maintain a pointer identifying which portions of a stamped packet, less than the entire stamped packet, have been transmitted in the physical layer frames.

2. The first access point of claim 1, wherein each of the stamps identifies the edge function.

3. The first access point of claim 1, wherein the first access function is configured to receive stamped packets from either the edge function in the first access point or an edge function in a different access point.

4. The first access point of claim 1, wherein the first access function is further configured to provide the stamped packet currently being transmitted and the pointer to the second access function in the second access point during handoff of the access terminal to the second access point.

5. The first access point of claim 4, wherein the first access function is further configured to store the stamped packet, in which a first portion of the data in the stamped packet has already been transmitted to the access terminal and a second portion of the data in the stamped packet requires transmission to the access terminal, and to provide the stored stamped packets to the second access function in the second access point during handoff of the access terminal to the second access point.

6. The first access point of claim 1, wherein the first access function is further configured to receive, during handoff of the access terminal to the first access point, the stamped packet currently being transmitted by a previous serving access point and a pointer that identifies which part of the stamped packet remains to be transmitted.

7. The first access point of claim 6, wherein the first access function is further configured to receive, during handoff of the access terminal to the first access point, stamped packets in which at least a portion of the data therein requires retransmission to the access terminal.

8. The first access point of claim 1, wherein:
the edge function receives all higher layer packets that are addressed to the access terminal, including when the first access point functions as the serving access point for the access terminal and also when the second access point functions as the serving access point for the access terminal; and
the edge function provides the stamped packets to the first access function when the first access point functions as the serving access point for the access terminal.

9. A first access point, comprising:
an edge function that is included within the first access point; and
a first access function configured to receive stamped packets from the edge function and to convert the stamped packets into physical layer frames for transmission to an access terminal over an air interface, the first access function being further configured to transmit the physical layer frames to the access terminal and maintain a pointer identifying which portions of a stamped packet, less than the entire stamped packet, have been transmitted in the physical layer frames;
wherein the edge function provides the stamped packets to a second access function within a second access point when the second access point functions as a serving access point for the access terminal.

10. The first access point of claim 9, wherein the first access function is further configured to receive the stamped packets from either the edge function in the first access point or an edge function in a different access point.

11. The first access point of claim 10, wherein the edge function is further configured to stamp the packets from the network, the edge function being configured to provide the stamped packets to the first access function in the first access point when the first access point functions as the serving access point for the access terminal.

12. The first access point of claim 9, wherein each of the stamps identifies the edge function.

13. The first access point of claim 9, wherein the first access function is further configured to provide the stamped packet currently being transmitted and the pointer to the second access function in the second access point during handoff of the access terminal to the second access point.

14. The first access point of claim 13, wherein the first access function is further configured store the stamped packet, in which a first portion of the data in the stamped packet has already been transmitted to the access terminal and a second portion of the data in the stamped packet requires transmission to the access terminal, and wherein the first access function is further configured to provide the stored stamped packets to the second access function in the second access point during handoff of the access terminal to the second access point.

15. The first access point of claim 9, wherein the first access function is further configured to receive, during handoff of the access terminal to the first access point, the stamped packet currently being transmitted by a previous serving access point and a pointer that identifies data remaining to be transmitted in the stamped packet currently being transmitted by the previous serving access point.

16. The access point of claim 15, wherein the first access function is further configured to receive, during handoff of the access terminal to the first access point, stamped packets in which at least a portion of the data therein requires retransmission to the access terminal.

17. A first access point, comprising:
a processor configured to receive packets from a network, and append a stamp to each of the packets to indicate the order in which the packets are received from the network at the first access point, the processor being further configured to provide the stamped packets to a second access point along with a first pointer identifying which portions of at least one of the stamped packets less than an entire packet have already been transmitted when the second access point becomes a serving access point for an access terminal.

18. The first access point of claim 17, wherein the processor is configured to receive stamped packets from a different access point, the processor further being configured to transmit data in the stamped packets to the access terminal, and wherein the processor is further configured to maintain a second pointer identifying which portions of data remain to be transmitted in a stamped packet currently being transmitted.

19. The access point of claim 18, wherein the processor is further configured to provide the stamped packet currently being transmitted and the second pointer to the second access point during handoff of the access terminal to the second access point.

20. A second access point, comprising:
a processor configured to receive stamped packets from a first access point when the second access point becomes a serving access point for an access terminal, wherein each stamped packet comprises a packet with a stamp appended to the packet, the stamps indicating the order in which the packets were received from a network, and wherein the processor is further configured to convert the stamped packets into physical layer frames for transmission to the access terminal over an air interface, to transmit data in the stamped packets to the access terminal, and to maintain a first pointer identifying which portions of data, less than an entire stamped packet, remain to be transmitted in a stamped packet currently being transmitted.

21. The second access point of claim 20, wherein the processor is further configured to stamp the packets from the network, the processor being configured to provide the stamped packets to a different access point.

22. The second access point of claim 20, wherein the processor is further configured to provide the stamped packet currently being transmitted and the first pointer to a target access point during handoff of the access terminal to the target access point.

23. The second access point of claim 22, wherein the processor is further configured to store stamped packets in which at least a portion of the data requires retransmission to the access terminal, and wherein the processor is further configured to provide the stored stamped packets to the target access point during handoff of the access terminal to the target access point.

24. The second access point of claim 20, wherein the processor is further configured to receive, during handoff of the access terminal from the first access point to the second access point, the stamped packet currently being transmitted by the first access point and a second pointer identifying which portions of data remain to be transmitted in the stamped packet currently being transmitted.

25. The second access point of claim 24, wherein the processor is further configured to receive, during handoff of the access terminal to the second access point, stamped packets in which at least a portion of the data therein requires retransmission to the access terminal.

26. A method of communications, comprising:
  receiving, at a first access point, packets from a network,
  appending a stamp to each of the packets to indicate the order in which they are received from the network;
  providing the stamped packets from the first access point to an access function within a second access point when the second access point is a serving access point for the access terminal;
  converting the stamped packets into physical layer frames for transmission to the access terminal over an air interface,
  transmitting the physical layer frames from the second access point to the access terminal; and
  maintaining a first pointer at the second access point identifying which portions of at least one of the stamped packets, less than an entire packet, remain to be transmitted in the physical layer frames currently being transmitted.

27. The method of claim 26 further comprising:
  providing a partially transmitted packet of the stamped packets to the second access point during handoff of the access terminal to the second access point; and
  providing a second pointer to the second access point during the handoff of the access terminal to the second access point, the second pointer identifying which portions of the partially transmitted packet remain to be transmitted.

28. The method of claim 27 further comprising transmitting data that remains to be transmitted in the partially transmitted packet from the second access point to the access terminal based on a state of the second pointer.

29. A first access point, comprising:
  means for interfacing with an access terminal;
  means for receiving packets from a network and appending a stamp to each of the packets to indicate the order in which the packets are received from the network, wherein the means for appending a stamp to each of the packets provides the stamped packets to an access function within a second access point when the second access point functions as a serving access point for the access terminal; and
  means for converting the stamped packets to physical layer frames and maintaining a pointer indicating which portions of a stamped packet less than an entire stamped packet have been transmitted in the physical layer frames to the access terminal.

30. A program stored on a non-transitory computer-readable medium, the computer-readable medium comprising instructions that are executable to:
  receive, at a first access point, packets from a network,
  append stamp to each of the packets to indicate the order in which they are received from the network;
  convert the stamped packets to physical layer frames;
  transmit the physical layer frames to an access terminal over an air interface;
  maintain a pointer indicating which portions of a stamped packet, less than an entire stamped packet, have been transmitted in the physical layer frames to the access terminal; and
  provide the stamped packets and the pointer to an access function within a second access point when the second access point functions as a serving access point for the access terminal.

31. A system for wireless communication, comprising:
  a first base station configure for wireless communication with an access terminal; and
  an edge function implemented on the first base station, the edge function comprising a virtual radio link protocol (VRLP) shared with other base stations and configured to convert a higher level packet into physical layer frames and to deliver the physical layer frames including a first portion of the higher level packet from a first base station to the access terminal and a second portion of the higher level packet from a second base station to the access terminal without retransmitting the first portion from the second base station to the access terminal.

32. An apparatus for wireless communication, comprising:
  an access terminal configured for wireless communication with a plurality of base stations, the access terminal configured for communication with a virtual radio link protocol (VRLP), the VRLP shared between the plurality of base stations and configured to convert a higher level packet into physical layer frames and to deliver the physical layer frames including a first portion of the higher level packet from a first base station to the access terminal and a second portion of the higher level packet from a second base station to the access terminal without retransmitting the first portion from the second base station to the access terminal.

* * * * *